J. F. MOSCROP.
METHOD AND APPARATUS FOR STERILIZING AND PRESERVING MILK AND OTHER FLUIDS.
APPLICATION FILED MAR. 21, 1919.

1,319,238.

Patented Oct. 21, 1919.
2 SHEETS—SHEET 1.

J. F. MOSCROP.
METHOD AND APPARATUS FOR STERILIZING AND PRESERVING MILK AND OTHER FLUIDS.
APPLICATION FILED MAR. 21, 1919.
1,319,238.
Patented Oct. 21, 1919.
2 SHEETS—SHEET 2.
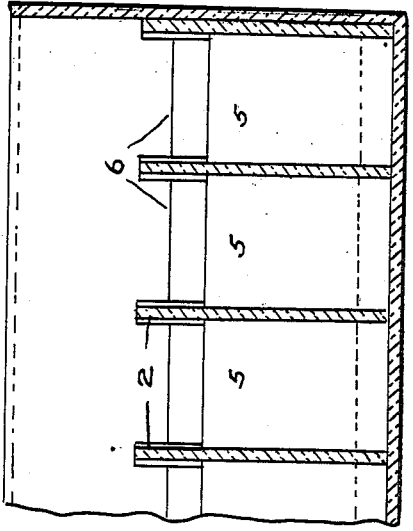
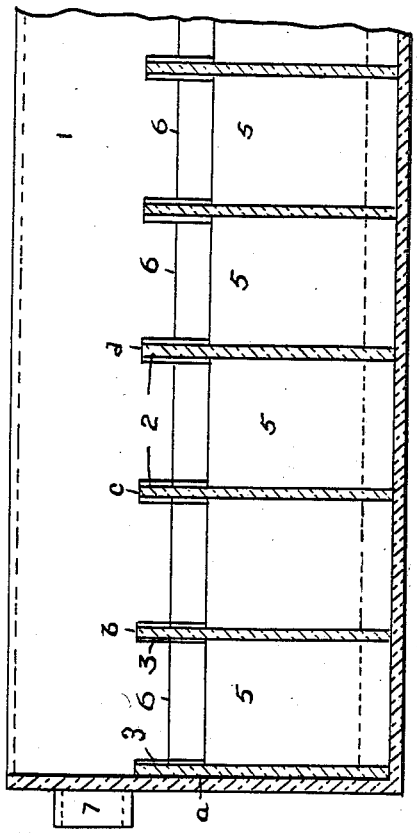
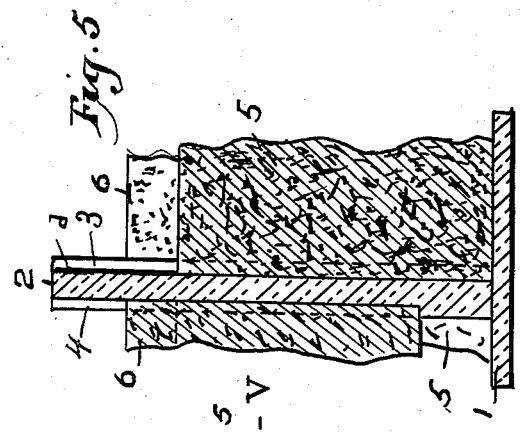
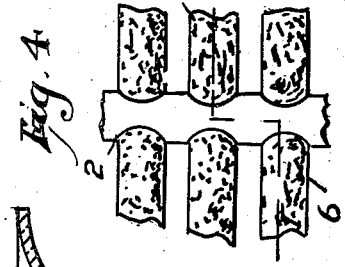
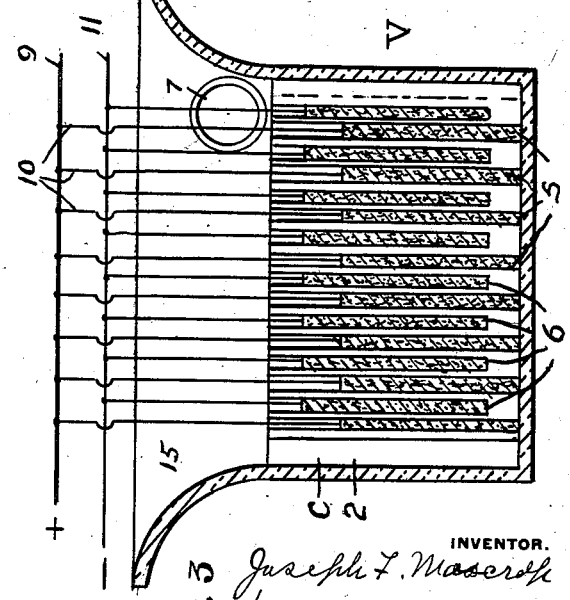
WITNESS
R.F. Dilworth
INVENTOR.
Joseph F. Moscrop
by F. N. Barber
Attorney

UNITED STATES PATENT OFFICE.

JOSEPH FRANKLIN MOSCROP, OF OMAHA, NEBRASKA.

METHOD AND APPARATUS FOR STERILIZING AND PRESERVING MILK AND OTHER FLUIDS.

1,319,238.  Specification of Letters Patent.  Patented Oct. 21, 1919.

Application filed March 21, 1919. Serial No. 283,996.

*To all whom it may concern:*

Be it known that I, JOSEPH F. MOSCROP, a citizen of the United States, residing at Omaha, in the county of Douglas and State of Nebraska, have invented new and useful Improvements in Methods and Apparatus for Sterilizing and Preserving Milk and other Fluids, of which the following is a specification.

My invention relates to methods and apparatus for sterilizing and preserving milk and other fluids. My invention was primarily designed for the treatment of milk electrically, but it may be applied to other fluids.

It is the object of this invention to provide for the purposes described a novel and efficient method and apparatus which utilizes the flow of electricity transversely through a thin layer or layers or strata of fluid, such as milk, for example, for the purpose of sterilizing it or otherwise prolonging the period preceding its deterioration. I do not depend upon the principles of pasteurization, though my invention may be operated for that purpose. It is my purpose to bring electricity intimately into contact with every particle of the milk or other fluid whereby it may be completely treated, but I intend to protect the invention herein shown and described in respect of such modifications thereof as shall come fairly within the scope of the appended claims.

Figure 1:
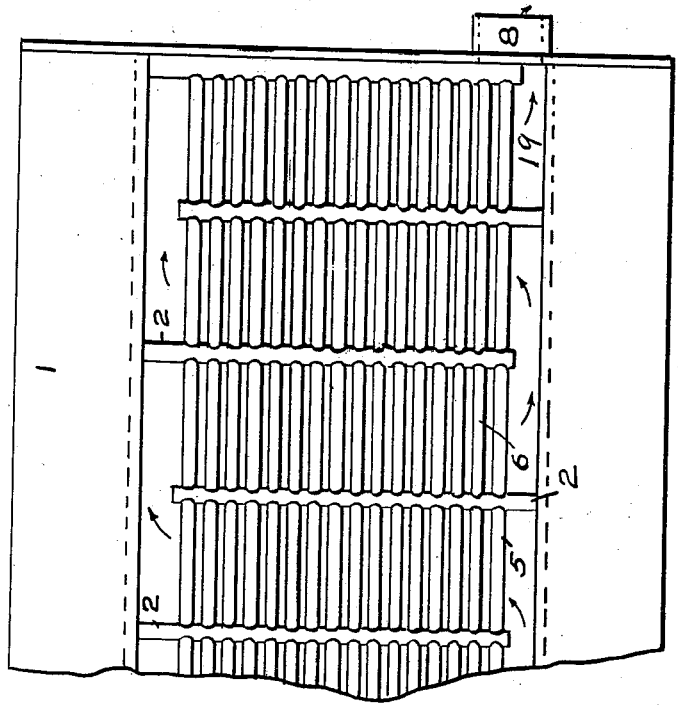
Figure 1:
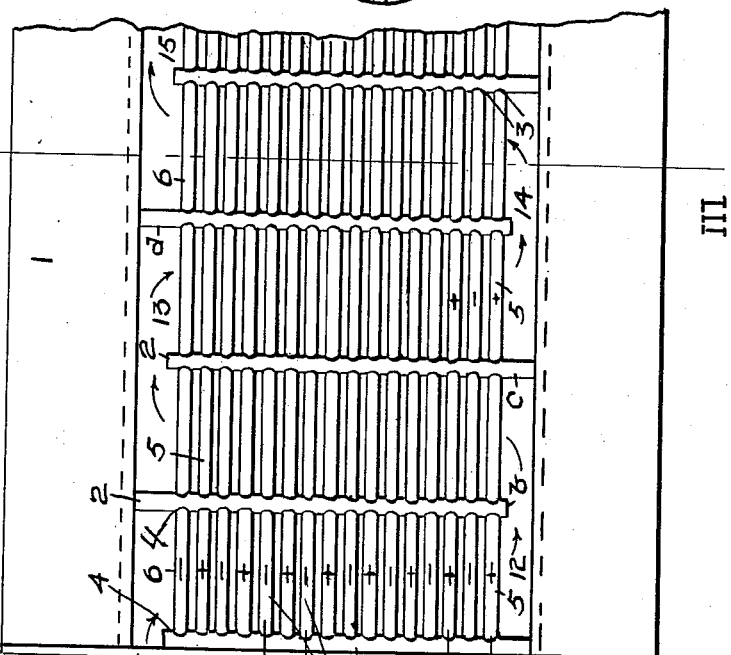

Referring to the accompanying drawings, Figure 1 is a plan view of my apparatus broken away in the center; Fig. 2, a longitudinal sectional view of Fig. 1; Fig. 3, a vertical cross-section of Fig. 1 on the line III—III; Fig. 4, an enlarged detail showing the manner of joining the carbons and partitions; and Fig. 5, a vertical section on the line V—V on Fig. 4.

On the drawing, 1 designates a tank made of any suitable material which may be readily cleaned and is impervious to liquids. In the tank, which has its upper side open, I place a series of preferably glass partitions or baffles 2 arranged parallel to each other and extending preferably transversely of the tank. These baffles rest preferably fluid-tight on the bottom of the tank, and alternate baffles engage preferably in a fluid-tight manner opposite sides of the tank as clearly shown on the drawings.

The opposing faces of consecutive baffles have the vertical grooves or guides 3 and 4 arranged alternately, the former extending from the tops of the baffles entirely to the bottoms thereof while the latter terminate a short distance from the bottoms. Vertical electrical conducting plates 5 and 6, composed of carbon, for example, are removably seated in opposing pairs of grooves 3 and 4, that is, the plates 5 are seated in opposing pairs of grooves 3, and the plates 6 in opposing pairs of grooves 4, so that all the plates 5 rest on the bottom of the tank while all the plates 6 are held above the bottom of the tank by their engagement with the lower ends of the grooves 4. The plates 6 extend above the tops of the plates 5.

7 is an inlet arranged to supply the fluid to be treated to the space between the first two baffles at one end of the tank, and 8 is an outlet placed at the opposite ends of the tank.

All the plates 5 are connected to one pole of an electric generator, not shown, and the plates 6 are connected to the remaining pole thereof. The manner of leading the electric current to and from the plates 5 and 6 can be supplied by any one skilled in the art of electricity. I have shown conventionally the positive wire 9 provided with the branches 10 leading to the plates 5, and the negative wire 11 leading to the plates 6. To save the confusion of numerous wires on Fig. 1, I have marked the polarity of the plates by the usual positive and negative signs.

Supposing the liquid to be treated is milk, it enters the tank through the inlet 7 and passes up and down in thin sheets between consecutive plates 5 and 6, confined between the baffles *a* and *b*. The milk emerges into the space 12 between the baffles *a* and *c* and opposite the end of the baffle *b*. From the space 12 the milk flows up and down in thin sheets between the plates 5 and 6 confined between the baffles *b* and *c*. The milk flows into the space 13 between the baffles *b* and *d* and opposite the baffle *c*. In like manner the milk flows in thin sheets up and down between the plates 5 and 6 confined between consecutive baffles. The milk flows through the several spaces 14, 15, etc., at the ends of the baffles and finally escapes from the space 19 through the outlet S. During the passage of the milk between consecutive plates it is traversed by currents of electricity, preferably in such low quantity as not to materially heat it, though it may be heated, if desired.

The upper part of the tank is flared to provide for any expansion or frothing of the milk or other fluid. By flaring it its height is reduced.

I do not limit myself to any definite size for the tank, the baffles and the plates 5 and 6, nor to the distances the latter are apart nor to the characteristics of the electricity, though I prefer to use direct current. However alternating current may be used. I have obtained good results by treating milk in a tank about three feet long by one foot wide by one foot high, with the baffles four inches apart and the plates 5 and 6 one-fourth of an inch apart and three-eighths of an inch thick. However good results can be obtained with the dimensions varying largely from those given above. I believe my invention to be broadly new and I desire protection accordingly.

I claim:

1. In an electric liquid preserving apparatus, a tank composed of insulating material, vertical parallel baffles standing on the bottom of the tank and composed of insulating material, the baffles being secured alternately to opposite sides of the tank and not reaching the remaining side thereof, parallel vertical conducting plates having their opposite edges against consecutive baffles, alternate plates being seated on the bottom of the tank and the remaining plates being spaced therefrom, and means connecting alternate plates to different poles of a source of electricity, the consecutive plates being arranged so closely together that the electric current may pass laterally from one plate to the next.

2. In an electric liquid preserving apparatus, a tank composed of insulating material, vertical parallel baffles standing on the bottom of the tank and composed of insulating material, the baffles being secured alternately to opposite sides of the tank and not reaching the remaining side thereof, parallel vertical conducting plates having their opposite edges against consecutive baffles, alternate plates being seated on the bottom of the tank and the remaining plates being spaced therefrom, and means connecting alternate plates to different poles of a source of electricity, the said baffles having grooves for holding the plates in place, and some of the grooves having stops to hold some of the plates from reaching the bottom of the tank.

Signed at Omaha, Nebraska, this 12 day of March, 1919.

JOSEPH FRANKLIN MOSCROP.